US009775124B2

United States Patent
Yi et al.

(10) Patent No.: US 9,775,124 B2
(45) Date of Patent: Sep. 26, 2017

(54) METHOD AND APPARATUS FOR PERFORMING SYNCHRONIZATION IN WIRELESS COMMUNICATION SYSTEM

(71) Applicant: LG ELECTRONICS INC., Seoul (KR)

(72) Inventors: Yunjung Yi, Seoul (KR); Byounghoon Kim, Seoul (KR); Joonkui Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 118 days.

(21) Appl. No.: 14/759,390

(22) PCT Filed: Jan. 27, 2014

(86) PCT No.: PCT/KR2014/000746
§ 371 (c)(1),
(2) Date: Jul. 6, 2015

(87) PCT Pub. No.: WO2014/119888
PCT Pub. Date: Aug. 7, 2014

(65) Prior Publication Data
US 2015/0341877 A1 Nov. 26, 2015

Related U.S. Application Data

(60) Provisional application No. 61/758,767, filed on Jan. 31, 2013, provisional application No. 61/912,029, filed on Dec. 5, 2013.

(51) Int. Cl.
*H04L 12/28* (2006.01)
*H04W 56/00* (2009.01)
(Continued)

(52) U.S. Cl.
CPC ......... *H04W 56/001* (2013.01); *H04L 5/0048* (2013.01); *H04W 56/00* (2013.01); *H04W 72/0453* (2013.01)

(58) Field of Classification Search
CPC ..... H04L 5/001; H04L 5/0035; H04L 5/0094; H04L 5/005; H04L 25/0202;
(Continued)

(56) References Cited

U.S. PATENT DOCUMENTS

2011/0080896 A1 4/2011 Krishnamurthy et al.
2011/0286376 A1* 11/2011 Yoo ..................... H04W 56/00
370/312
(Continued)

FOREIGN PATENT DOCUMENTS

| WO | 2011/082689 | 7/2011 |
|---|---|---|
| WO | 2012/130173 | 10/2012 |
| WO | 2012/134245 | 10/2012 |

OTHER PUBLICATIONS

PCT International Application No. PCT/KR2014/000746, Written Opinion of the International Authority dated Apr. 29, 2014, 1 page.

*Primary Examiner* — Wei Zhao
*Assistant Examiner* — Lionel Preval
(74) *Attorney, Agent, or Firm* — Lee Hong Degerman Kang Waimey

(57) ABSTRACT

A method for and apparatus for performing a synchronization in a wireless communication system is provided. A wireless device checks a configuration including a resource relationship about reference signals (RSs) between a first cell and a second cell; receives a first reference signal (RS) from the first cell; determines a timing reference to receive a second RS based on the resource relationship; receives the second RS from the second cell based on the timing refer-
(Continued)

ence; performs a frequency tracking using the second RS; and decodes data signals from the second cell.

12 Claims, 11 Drawing Sheets

(51) Int. Cl.
*H04L 5/00* (2006.01)
*H04W 72/04* (2009.01)

(58) Field of Classification Search
CPC  H04L 5/0048; H04W 56/0045; H04W 56/00; H04W 48/12; H04W 56/001; H04W 72/0453; H04W 48/16; H04B 7/024; H04B 7/0452; H04J 11/0073; H04J 11/0076
See application file for complete search history.

(56) References Cited

U.S. PATENT DOCUMENTS

| | | | | |
|---|---|---|---|---|
| 2013/0279437 A1* | 10/2013 | Ng | ........................ | H04W 48/16 370/329 |
| 2014/0198763 A1* | 7/2014 | Sorrentino | ............. | H04B 7/024 370/330 |
| 2014/0204825 A1* | 7/2014 | Ekpenyong | ............. | H04L 5/001 370/312 |

* cited by examiner

METHOD AND APPARATUS FOR PERFORMING SYNCHRONIZATION IN WIRELESS COMMUNICATION SYSTEM

CROSS-REFERENCE TO RELATED APPLICATIONS

This application is the National Stage filing under 35 U.S.C. 371 of International Application No. PCT/KR2014/000746, filed on Jan. 27, 2014, which claims the benefit of U.S. Provisional Application Nos. 61/758,767, filed on Jan. 31, 2013 and 61/912,029, filed on Dec. 5, 2013, the contents of which are all hereby incorporated by reference herein in their entirety.

TECHNICAL FIELD

The present invention relates to wireless communications, and more particularly, to a method and apparatus for performing synchronization in a wireless communication system consisting of multiple carriers over single frequency or multiple frequencies.

BACKGROUND ART

3rd generation partnership project (3GPP) long term evolution (LTE) is an improved version of a universal mobile telecommunication system (UMTS) and a 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

The commercialization of the 3GPP LTE (A) system is being recently accelerated. The LTE systems are spread more quickly as respond to users' demand for services that may support higher quality and higher capacity while ensuring mobility, as well as voice services. The LTE system provides for low transmission delay, high transmission rate and system capacity, and enhanced coverage.

To increase the capacity for the users' demand of services, increasing the bandwidth may be essential, a carrier aggregation (CA) technology aiming at obtaining an effect, as if a logically wider band is used, by grouping a plurality of physically non-continuous bands in a frequency domain has been developed to effectively use fragmented small bands. Individual unit carriers grouped by carrier aggregation is known as a component carrier (CC). Each CC is defined by a single bandwidth and a center frequency.

A system in which data is transmitted and/or received in a broadband through a plurality of CCs is referred to as a multi-component carrier system (multi-CC system) or a CA environment. The multi-component carrier system performs both a narrow band and a broad band by using one or more carriers. For example, when an each carrier corresponds to a bandwidth of 20 MHz, a bandwidth of a maximum of 100 MHz may be supported by using five carriers.

In order to operate the multi-CC system, various control signals are required between a base station (BS) as an eNB (enhanced Node B) and a User equipment as a Terminal. Also an efficient cell planning for multi-CCs is required. Also various signals or efficient cell planning schemes are required to transmit between the eNB and the UE to support inter-cell interference reduction and carrier extensions. Furthermore, inter-node resource allocation by tight coordination among eNBs for a UE is also feasible where multi-CC aggregation is achieved over multiple eNBs/nodes. An efficient operation scheme for the cell planning including a new carrier which is necessarily transmitted restricted (or eliminated) controls and UE in a small cell cluster environment needs to be defined.

Furthermore, it is need to be defined to perform synchronization in a cell where legacy synchronization signals are not transmitted in the small cell or reduced synchronization signals are transmitted and thus assistance from a legacy carrier or a carrier transmitting full synchronization signals may be necessary.

DISCLOSURE

Technical Problem

The present invention provides a method and apparatus for performing synchronization in a wireless communication system.

The present invention also provides a method and apparatus for detecting reference signals between anchor and dependent carrier in a wireless communication system.

The present invention also provides a method and apparatus for performing synchronization for time and frequency separately in a wireless communication system.

The present invention also provides a method and apparatus for decoding data by using reference signals of relationship between a serving cell and data transmission points in a wireless communication system.

Technical Solution

In an aspect, a method for performing a synchronization in a wireless communication system is provided. The method may include receiving a configuration including a resource relationship about reference signals (RSs) between a first cell and a second cell; receiving a first reference signal (RS) from the first cell; determining a timing reference to receive a second RS based on the resource relationship; receiving the second RS from the second cell based on the timing reference; performing a frequency tracking using the second RS; and decoding data signals from the second cell.

The method may further include that resource relationship includes subframe information indicating a subframe gap between a subframe at which the first RS is received and a subframe at which the second RS is received, and resource information indicating offset between resource blocks at which the first RS is received and resource blocks at which the second RS is received.

In another aspect, a wireless device for performing a synchronization in a wireless communication system is provided. The wireless device includes a radio frequency (RF) unit for transmitting and receiving a radio signal; and a processor operatively coupled to the RF unit, wherein the processor is configured for: receiving a configuration including a resource relationship about reference signals (RSs) between a first cell and a second cell; receiving a first reference signal (RS) from the first cell; determining a timing reference to receive a second RS based on the resource relationship; receiving the second RS from the second cell based on the timing reference; performing a frequency tracking using the second RS; and decoding data signals from the second cell.

Advantageous Effects

The proposed embodiment supports that a wireless device can detect a resource relationship about reference signals between a first cell and second cells to support more efficient measurement for decoding data.

MODE FOR INVENTION

Figure 1:
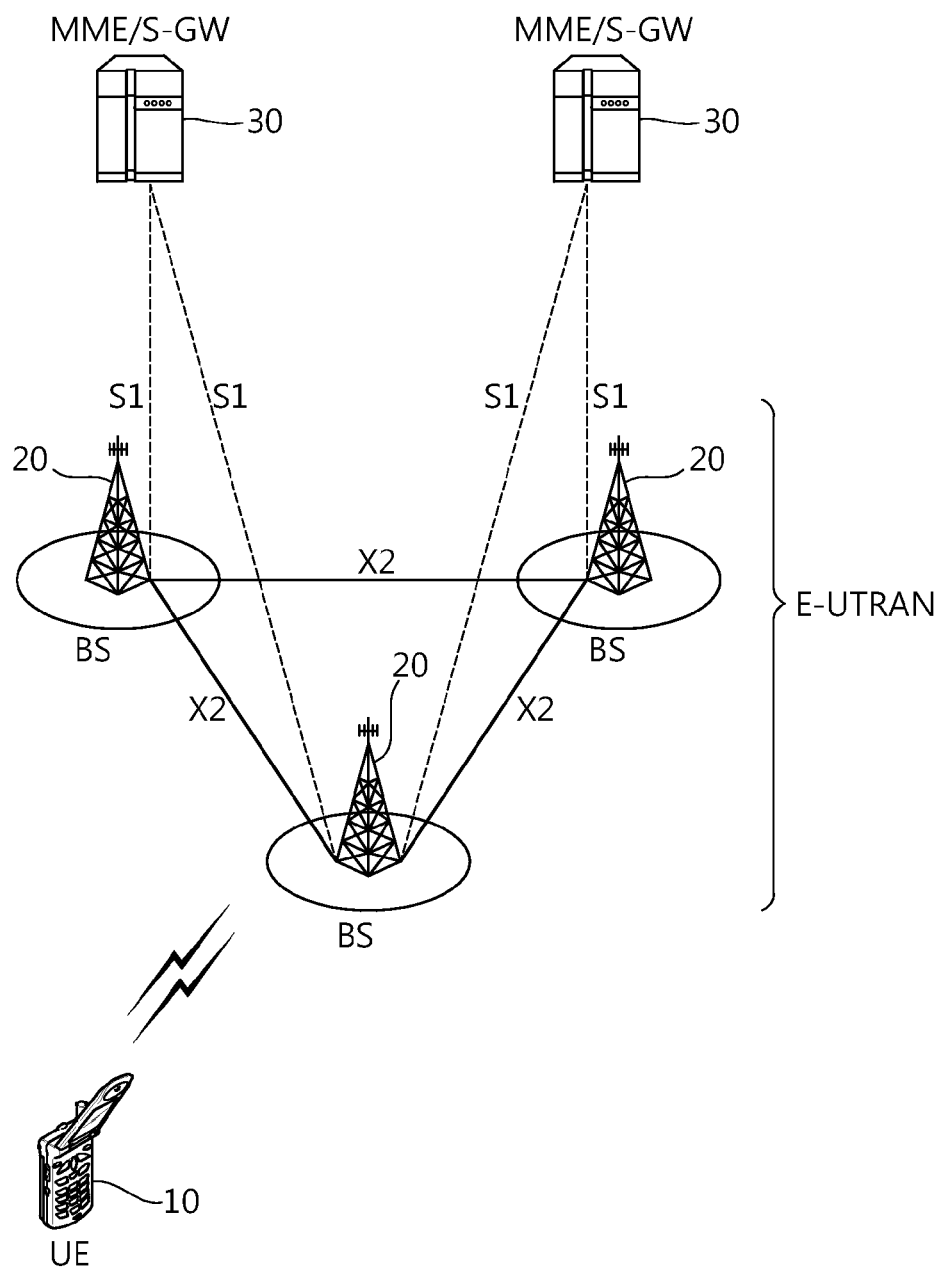
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

Multi-access schemes applied to the wireless communication system are not limited. Namely, various multi-access schemes such as CDMA Code Division Multiple Access), TDMA (Time Division Multiple Access), FDMA (Frequency Division Multiple Access), OFDMA (Orthogonal Frequency Division Multiple Access), SC-FDMA (Single Carrier-FDMA), OFDM-FDMA, OFDM-TDMA, OFDM-CDMA, or the like, may be used. For uplink transmission and downlink transmission, a TDD (Time Division Duplex) scheme in which transmission is made by using a different time or an FDD (Frequency Division Duplex) scheme in which transmission is made by using different frequencies may be used.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
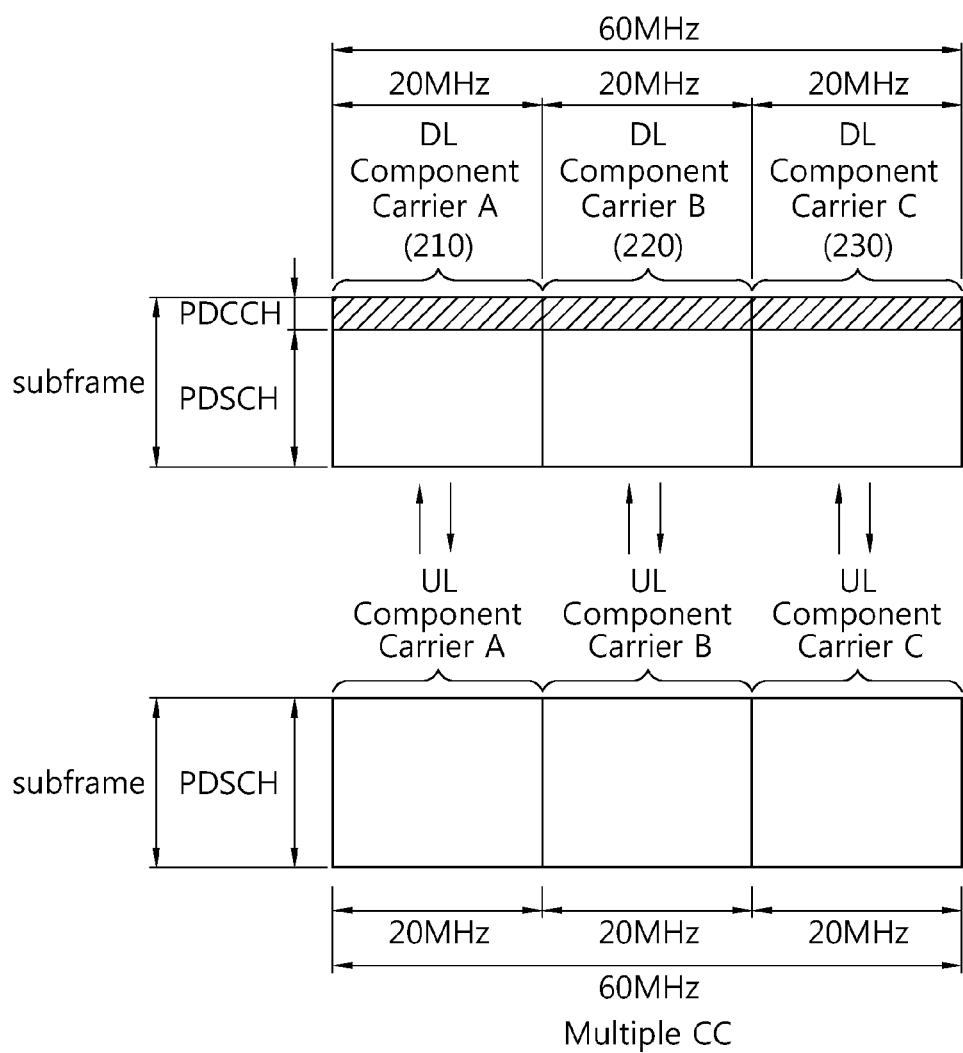
FIG. 2 shows an exemplary concept for a carrier aggregation (CA) technology according to an exemplary embodiment of the present invention.

FIG. 2 shows an exemplary concept for a carrier aggregation (CA) technology according to an exemplary embodiment of the present invention.

Referring to FIG. 2, the DL/UL subframe structure considered in 3GPP LTE-A (LTE-Advanced) system where multiple CCs are aggregated (in this example, 3 carriers exist) is illustrated, a UE can monitor and receive DL signal/data from multiple DL CCs at the same time. However, even if a cell is managing N DL CCs, the network may configure a UE with M DL CCs, where M≤N so that the UE monitoring of the DL signal/data is limited to those M DL CCs. In addition, the network may configure L DL CCs as the main DL CCs from which the UE should monitor/receive DL signal/data with a priority, either UE-specifically or cell-specifically, where L≤M≤N. So the UE may support one or more carriers (Carrier 1 or more Carriers 2 . . . N) according to UE's capability thereof.

Hereinafter, a CC may be divided into a primary component carrier (PCC) and a secondary component carrier (SCC) depending on whether or not they are activated. A PCC is a carrier which is constantly activated, and an SCC is a carrier which is activated or deactivated according to particular conditions. Here, activation refers to a state in which traffic data is transmitted or received or a state in which traffic data is ready to be transmitted or received. Deactivation refers to a state in which traffic data cannot be transmitted or received and measurement or transmission or reception of minimum information is available. Furthermore, the PCC can be also activated or deactivated using an indication of activation/Deactivation as a bit. The UE can camp on the PCC as a Primary serving cell (Pcell) at first in initial access. The UE may use only one primary component carrier or one or more secondary component carriers along with a primary component carrier. The UE may be allocated a primary component carrier and/or a secondary component carrier from the BS.

A PCC is a carrier by which primary control information items are exchanged between a BS and an UE. An SCC is a carrier allocated according to a request from an UE or an instruction from a BS. A PCC may be used for an UE to enter a network and/or may be used to allocate an SCC. A PCC may be selected from among entire set carriers, rather than being fixed to a particular carrier. A carrier set as an SCC may also be changed into a PCC.

As described above, a DL CC may construct one serving cell, and the DL CC and a UL CC may construct one serving cell by being linked with each other. Further, a primary serving cell (PCell) corresponds to a PCC, and a secondary serving cell (SCell) corresponds to an SCC. Each carrier and combination of carriers may also be referred to as each one serving cell as a PCell or a SCell. That is, the one serving cell may correspond to only one DL CC, or may correspond to both the DL CC and the UL CC.

A Pcell is a resource in which the UE initially establishes a connection (or a RRC connection) among several cells. The Pcell serves as a connection (or RRC connection) for signaling with respect to a plurality of cells (CCs), and is a special CC for managing UE context which is connection information related to the UE. Further, when the Pcell (PCC) establishes the connection with the UE and thus is in an RRC connected mode, the PCC always exists in an activation state. A SCell (SCC) is a resource assigned to the UE other than the Pcell (PCC). The SCell is an extended carrier for additional resource assignment, etc., in addition to the PCC, and can be divided into an activation state and a deactivation state. The SCell is initially in the deactivation state. If the SCell is deactivated, it includes not transmit SRS on the SCell, not report CQI/PMI/RI/PTI for the SCell, not transmit on UL-SCH on the SCell, not monitor the PDCCH on the SCell, not monitor the PDCCH for the SCell. The UE receives an Activation/Deactivation MAC control element in this TTI activating or deactivating the SCell.

A MAC control element including an activation indicator has a length of 8 bits, is used for activation for each serving cell. Herein, a Pcell is implicitly regarded as being activated between the UE and the eNB and, thus the Pcell is not additionally included in the activation indicator. An index of the Pcell is always given a specific value, and it is assumed herein that the index is given 0. So the Scells are indexed with 1, 2, 3, . . . , 7 for a serving cell index 1 corresponds to a $7^{th}$ bit from the left, which are the remaining indices other than 0, i.e., the index of the Pcell.

To enhance the user throughput, it is also considered to allow inter-node resource aggregation over more than one eNB/node where a UE may be configured with more than one carrier groups. In such cases, it is also feasible to configure PCell per each carrier group which particularly may not be deactivated. In other words, PCell per each carrier group may maintain its state to active all the time once it is configured to a UE. In that case, serving cell index i corresponding to a PCell in a carrier group which does not include serving cell index 0 (which is master PCell) cannot be used for activation/deactivation. More particularly, if serving cell index 0, 1, 2 are configured by one carrier group whereas serving cell index 3, 4, 5 are configured by the other carrier group in two carrier group scenarios where serving cell index 0 is PCell and serving cell index 3 is the PCell of the second carrier group, then only bits corresponding 1 and 2 are assumed to be valid for the first carrier group cell activation/deactivation messages whereas bits corresponding 4 and 5 are assumed to be valid for the second carrier group cell activation/deactivation. To make some distinction between PCell for the first carrier group and the second carrier group, the PCell for the second carrier group can be noted as 'S-PCell' hereinafter.

Herein, the index of the serving cell may be a logical index determined relatively for each UE, or may be a physical index for indicating a cell of a specific frequency band. The CA system supports a non-cross carrier scheduling (self-carrier scheduling), or cross carrier scheduling.

Figure 3:
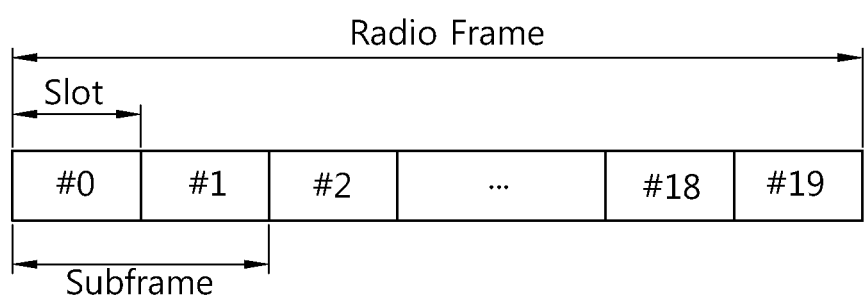
FIG. 3 shows a structure of a radio frame to which the present invention is applied.

FIG. 3 shows a structure of a radio frame to which the present invention is applied.

Referring to FIG. 3, a radio frame includes 10 subframes, and one subframe includes two slots. The time taken for one subframe to be transmitted is called a Transmission Time Interval (TTI). For example, the length of one subframe may be 1 ms, and the length of one slot may be 0.5 ms.

One slot includes a plurality of OFDM symbols in the time domain and includes a plurality of Resource Blocks (RBs) in the frequency domain. An OFDM symbol is for representing one symbol period because downlink OFDMA is used in 3GPP LTE system and it may be called an SC-FDMA symbol or a symbol period depending on a multi-access scheme. An RB is a resource allocation unit, and it includes a plurality of contiguous subcarriers in one slot. The number of OFDM symbols included in one slot may vary according to the configuration (configuration) of the CP (Cyclic Prefix).

The CP includes an extended CP and a normal CP. For example, if normal CP case, the OFDM symbol is composed by 7. If configured by the extended CP, it includes 6 OFDM symbols in one slot. If the channel status is unstable such as moving at a fast pace UE, the extended CP can be configured to reduce an inter-symbol interference.

Herein, the structure of the radio frame is only illustrative, and the number of subframes included in a radio frame, or the number of slots included in a subframe, and the number of OFDM symbols included in a slot may be changed in various ways to apply new communication system. This invention has no limitation to adapt to other system by varying the specific feature and the embodiment of the invention can apply with changeable manners to a corresponding system.

Figure 4:
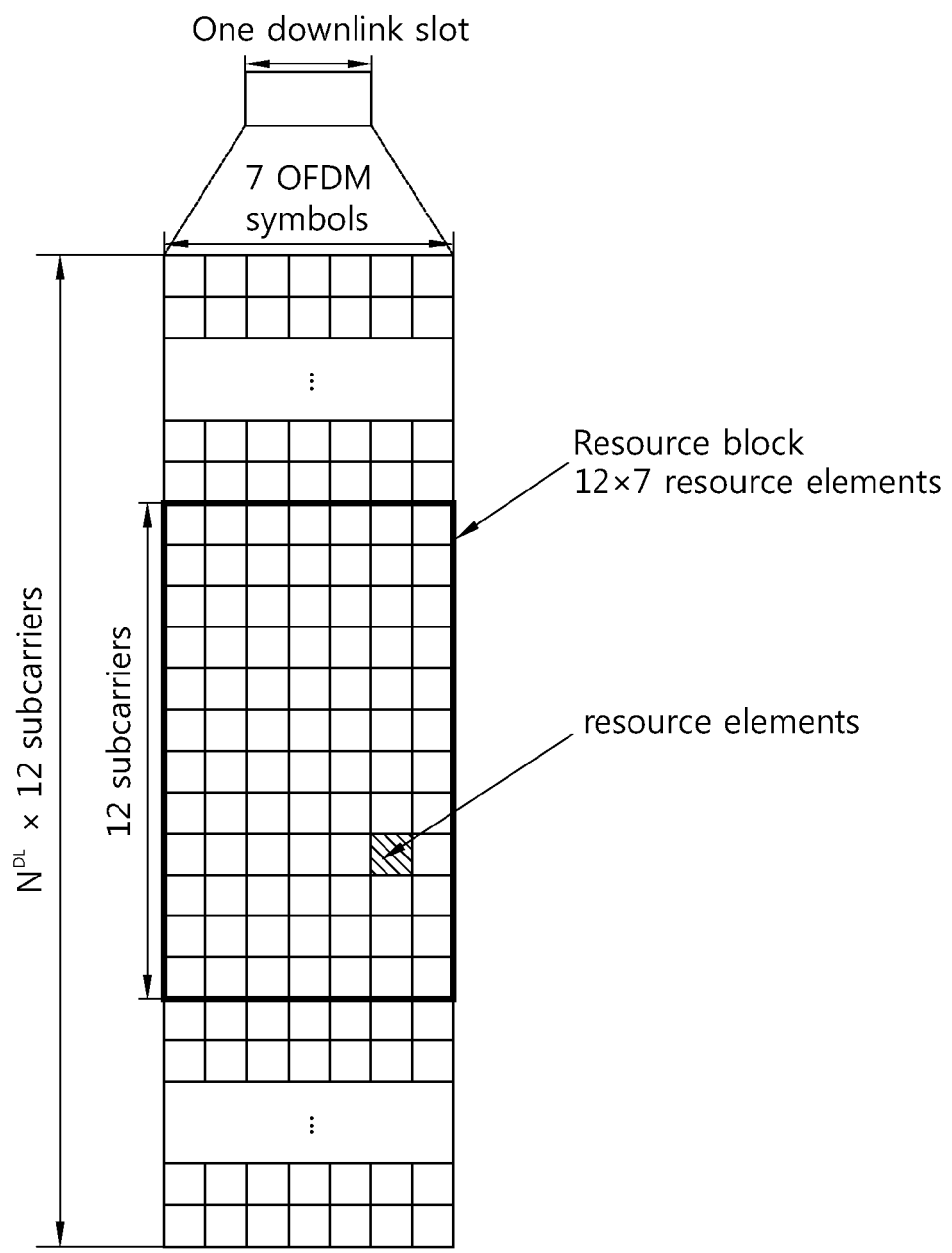
FIG. 4 is an exemplary diagram showing a resource grid for one downlink slot to which the present invention is applied.

FIG. 4 is an exemplary diagram showing a resource grid for one downlink slot to which the present invention is applied.

Referring to FIG. 4, the downlink slot includes a plurality of OFDM symbols in the time domain. For example, one downlink slot is illustrated as including 7 OFDMA symbols and one Resource Block (RB) is illustrated as including 12 subcarriers in the frequency domain, but not limited thereto.

Each element on the resource grid is called a Resource Element (RE). One resource block includes 12×7 (or 6) REs. The number $N^{DL}$ of resource blocks included in a downlink slot depends on a downlink transmission bandwidth that is set in a cell. Bandwidths that are taken into account in LTE are 1.4 MHz, 3 MHz, 5 MHz, 10 MHz, 15 MHz, and 20 MHz. If the bandwidths are represented by the number of resource blocks, they are 6, 15, 25, 50, 75, and 100, respectively. One or more resource blocks corresponding to each band may be combined to form a Resource Block Group (RBG). For example, two contiguous resource blocks may form one resource block group.

In LTE, the total number of resource blocks for each bandwidth and the number of resource blocks that form one resource block group are shown in Table 1.

TABLE 1

| Bandwidth | Total number of RBs | Number of RBs belonging to one RBG | Total number of RBGs |
| --- | --- | --- | --- |
| 1.4 MHz | 6 | 1 | 6 |
| 3 MHz | 15 | 2 | 8 |
| 5 MHz | 25 | 2 | 13 |
| 10 MHz | 50 | 3 | 17 |
| 15 MHz | 75 | 4 | 19 |
| 20 MHz | 100 | 4 | 25 |

Referring to Table 1, the total number of available resource blocks is different depending on a given bandwidth. What the total number of resource blocks differs means that the size of information indicative of resource allocation is different.

Figure 5:
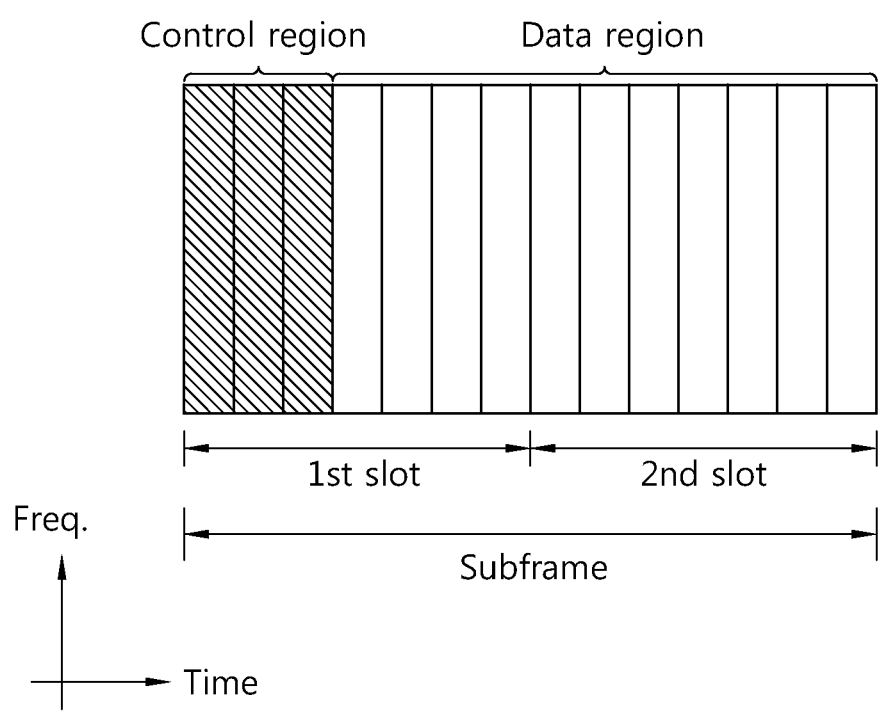
FIG. 5 shows a structure of a downlink subframe to which the present invention is applied.

FIG. 5 shows a structure of a downlink subframe to which the present invention is applied.

Referring to FIG. 5, a subframe includes two slots. The former 0 or 1 or 2 or 3 OFDM symbols of the first slot within the subframe correspond to a control region to be assigned with a control channel, and the remaining OFDM symbols thereof become a data region to which a physical downlink shared chancel (PDSCH) is allocated.

Examples of downlink control channels used in the 3GPP LTE include a Physical Control Format Indicator Channel (PCFICH), a Physical Downlink Control Channel (PDCCH), and a Physical Hybrid-ARQ Indicator Channel (PHICH).

The PCFICH transmitted in a 1st OFDM symbol of the subframe carries a control format indicator (CFI) regarding the number of OFDM symbols (i.e., a size of the control region) used for transmission of control channels in the subframe, that is, carries information regarding the number of OFDM symbols used for transmission of control channels within the subframe. The UE first receives the CFI on the PCFICH, and thereafter monitors the PDCCH.

The PHICH carries acknowledgement (ACK)/not-acknowledgement (NACK) signals in response to an uplink Hybrid Automatic Repeat Request (HARQ). That is, ACK/NACK signals for uplink data that has been transmitted by a UE are transmitted on a PHICH.

Figure 7:
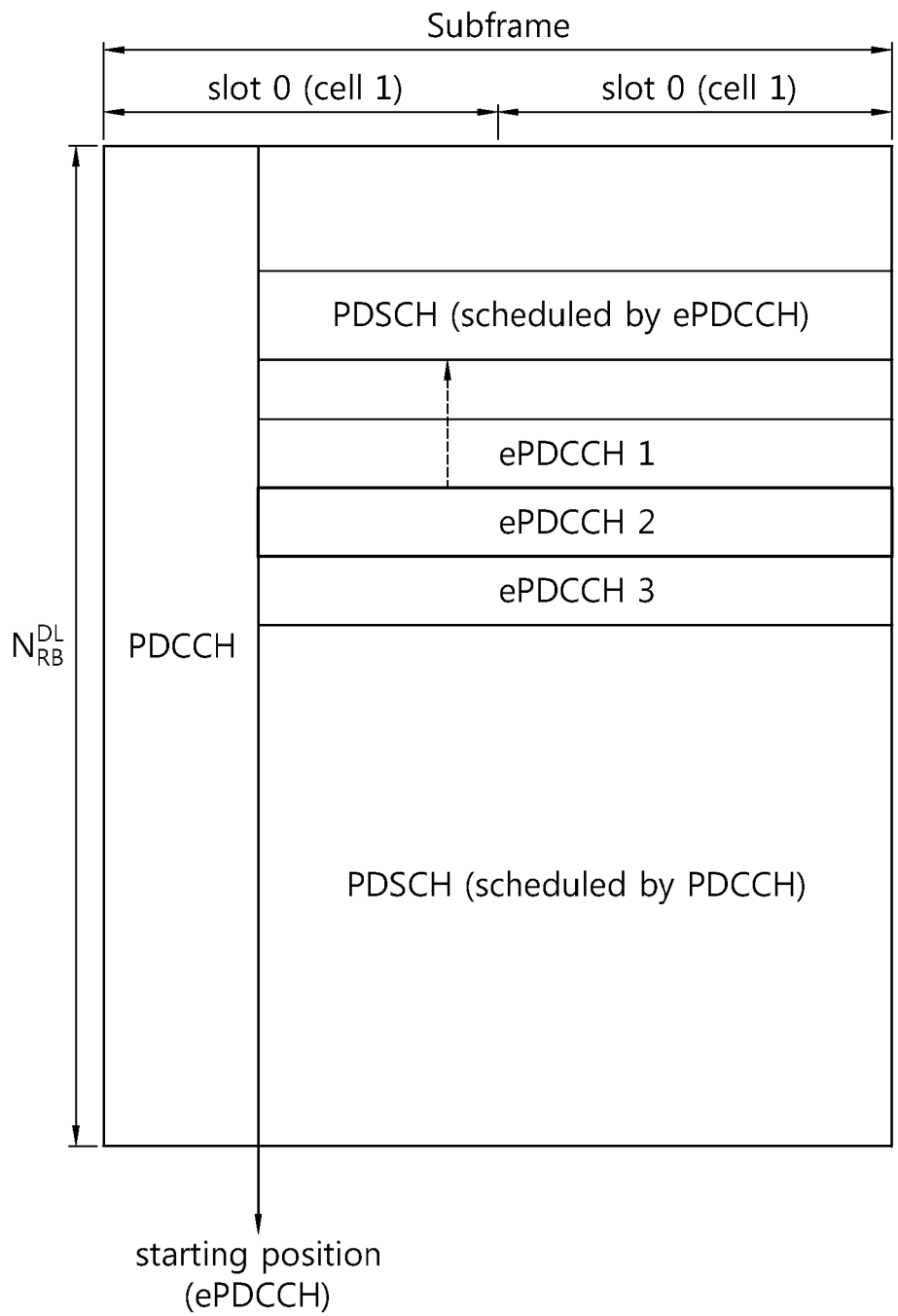
FIG. 7 shows downlink control channels to which the present invention is applied.

A PDCCH (or ePDCCH) is a downlink physical channel, a PDCCH can carry information about the resource allocation and transmission format of a Downlink Shared Channel (DL-SCH), information about the resource allocation of an Uplink Shared Channel (UL-SCH), paging information about a Paging Channel (PCH), system information on a DL-SCH, information about the resource allocation of a higher layer control message, such as a random access response transmitted on a PDSCH, a set of transmit power control commands for UEs within a certain UE group, the activation of a Voice over Internet Protocol (VoIP), etc. A plurality of PDCCHs may be transmitted within the control region, and a UE can monitor a plurality of PDCCHs. Here, the ePDCCH is shown in FIG. 7 more details.

The PDCCH is transmitted on one Control Channel Element (CCE) or on an aggregation of some contiguous CCEs. A CCE is a logical assignment unit for providing a coding rate according to the state of a radio channel to a PDCCH. The CCE corresponds to a plurality of resource element groups (REGs). A format of the PDCCH and the number of bits of the available PDCCH are determined according to a correlation between the number of CCEs and the coding rate provided by the CCEs. The BS determines a PDCCH format according to a Downlink Control Information (DCI) to be transmitted to the UE, and attaches a cyclic redundancy check (CRC) to control information. The DCI includes uplink or downlink scheduling information or includes an uplink transmit (Tx) power control command for arbitrary UE groups. The DCI is differently used depending on its format, and it also has a different field that is defined within the DCI. Table 2 shows DCIs according to a DCI format.

TABLE 2

| DCI format | Description |
|---|---|
| 0 | Used for the scheduling of a PUSCH (uplink grant) |
| 1 | Used for the scheduling of one PDSCH codeword |
| 1A | Used for the simplified scheduling of one PDSCH codeword and for a random access procedure reset by a PDCCH command |
| 1B | Used for the simplified scheduling of one PDSCH codeword using precoding information |
| 1C | Used for the simplified scheduling of one PDSCH codeword and the notification of a change of an MCCH |
| 1D | Used for precoding and the simplified scheduling of one PDSCH codeword including power offset information |
| 2 | Used for PDSCH scheduling for a UE configured in spatial multiplexing mode |
| 2A | Used for the PDSCH scheduling of a UE configured in large delay CDD mode |
| 2B | Used for Resource assignments for PDSCH using up to 2 antenna ports with UE-specific reference signals |
| 2C | Used for Resource assignment for PDSCH using up to 8 antenna ports with UE-specific reference signals |
| 2D | Used for Resource assignment for PDSCH using up to 8 antenna ports with UE-specific reference signals |
| 3 | Used for the transmission of a TPC command for a PUCCH and PUSCH including 2-bit power coordination |
| 3A | Used for the transmission of a TPC command for a PUCCH and PUSCH including single bit power coordination |

The DCI Format 0 indicates uplink resource allocation information, the DCI formats 1-2 indicate downlink resource allocation information, and the DCI formats 3 and 3A indicate uplink Transmit Power Control (TPC) commands for specific UE groups. The fields of the DCI are sequentially mapped to an information bit. For example, assuming that DCI is mapped to an information bit having a length of a total of 44 bits, a resource allocation field may be mapped to a $10^{th}$ bit to $23^{rd}$ bit of the information bit.

The DCI may include resource allocation of the PDSCH which is referred to as a downlink (DL) grant, resource allocation of a PUSCH which is referred to as an uplink (UL) grant), a set of transmit power control commands for individual UEs in any UE group and/or activation of a voice over Internet protocol (VoIP). The following Table 3 shows the DCI of Format 0 which includes uplink resource allocation information or an uplink grant.

TABLE 3

Carrier indicator - 0 or 3 bits
Flag for identifying Format 0/Format 1A - 1 bit, 0 indicates Format 0, 1 indicates Format 1A.
Frequency hopping flag - 1 bit, is a Most Significant Bit (MSB) corresponding to resource allocation at need and used to assign multiple clusters.
Resource block assignment and hopping resource allocation - $\lceil \log_2(N_{RB}^{UL}(N_{RB}^{UL} + 1)/2) \rceil$ bits
 PUSCH hopping (corresponding to only single cluster assignment):
  $N_{UL\_hop}$ MSBs are used to obtain an $n_{PRB}(i)$ value.
  ($\lceil \log_2(N_{RB}^{UL}(N_{RB}^{UL} + 1)/2) \rceil - N_{UL\_hop}$) bits provide the resource allocation of the first slot of an uplink subframe.
 In single cluster assignment, non-hopping PUSCH
  ($\lceil \log_2(N_{RB}^{UL}(N_{RB}^{UL} + 1)/2) \rceil$) bits provide the resource allocation of an uplink subframe.
 In multi-cluster assignment, non-hopping PUSCH: Resource assignment is obtained from a combination of a frequency hopping flag field and a resource block assignment and hopping resource allocation field.

$$\left\lceil \log_2\left(\binom{\lceil N_{RB}^{UL}/p + 1 \rceil}{4}\right)\right\rceil$$

bits provide resource allocation in an uplink subframe.
 Wherein, P depends on the number of downlink resource blocks.

TABLE 3-continued

Modulation and coding scheme/redundancy version - 5 bits
New data indicator - 1 bit
TPC command for a scheduled PUSCH - 2 bits
Cyclic shift and OCC index for DM RS - 3 bits
Uplink index - 2 bits, only exist for a TDD operation, that is, an uplink-downlink configuration 0
Downlink Assignment Index (DAI) - 2 bits, only exist for TDD operations, that is, uplink-downlink configurations 1-6
CQ1 request - 1 or 2 bits, a 2 bit field is applied to a UE configured using at least one downlink cell.
SRS request - 0 or 1 bit.
Multi-cluster flag - 1 bit.

Here, the flag is 1-bit information and is an indicator for distinguishing the DCI 0 and the DCI 1A from each other. The hopping flag is 1-bit information, and it indicates whether frequency hopping is applied or not when a UE performs uplink transmission. For example, when the hopping flag is 1, it indicates that frequency hopping is applied at the time of uplink transmission. When the hopping flag is 0, it indicates that frequency hopping is not applied at the time of uplink transmission. The resource block assignment and hopping resource allocation is also called a resource allocation field. The resource allocation field indicates the physical locations and amount of resources that are allocated to a UE. Although not shown in Table 3, an uplink grant includes redundant bits or padding bits for constantly maintaining the total number of bits. The DCI has several formats. Although DCI has control information of a different format, the length of bits can be identically controlled using the redundant bits. Thus, a UE can perform blind decoding smoothly.

In Table 3, for example, if the resource allocation field has 13 bits in a band of an FDD 20 MHz, an uplink grant has a total of 27 bits except a CIF field and a CRC field. If the length of bits determined as the input of blind decoding is 28 bits, an eNB makes the uplink grant the total number of 28 bits by adding the redundant bits of 1 bit to the uplink grant at the time of scheduling. Herein, the all the redundant bits may be set to 0 because they do not include special information. Of course, the number of redundant bits may be smaller than or greater than 2.

Figure 6:
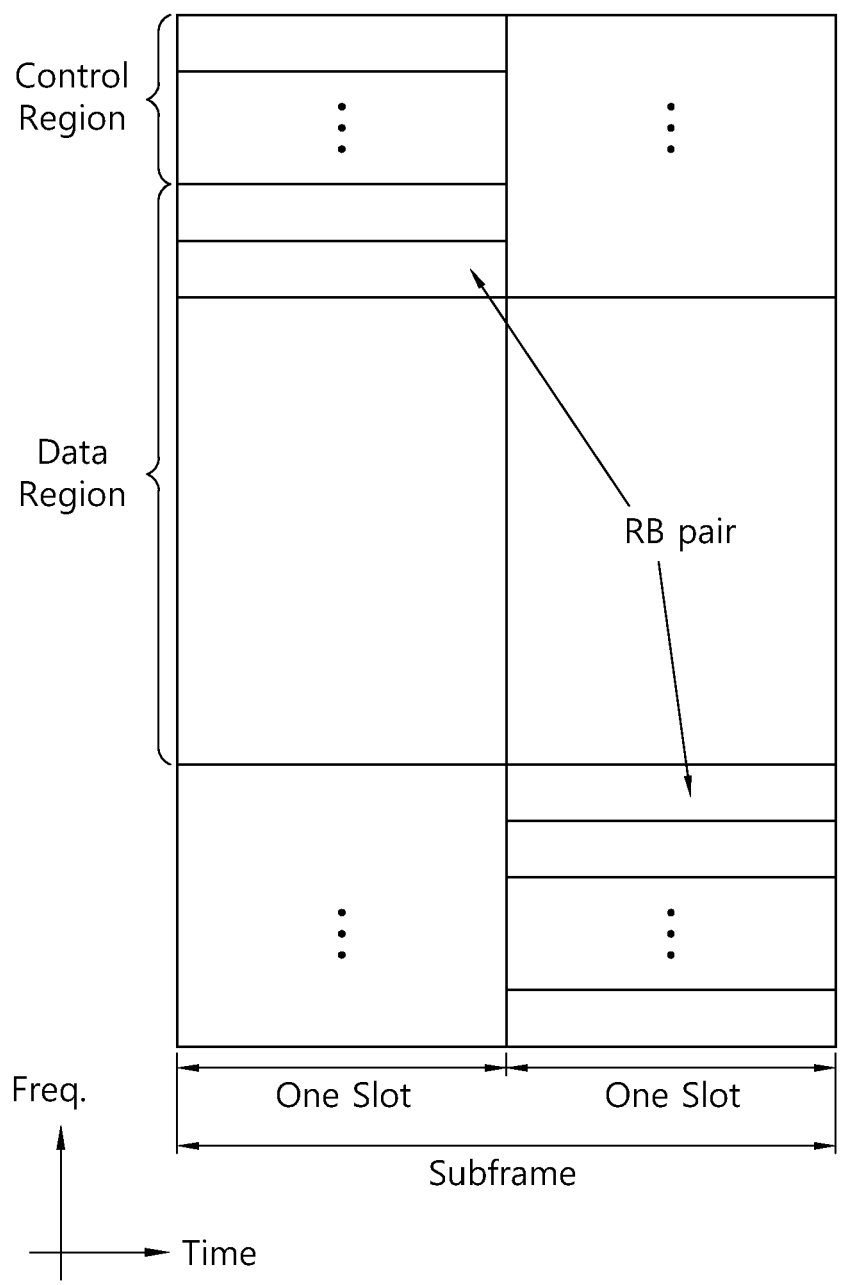
FIG. 6 shows an example of a structure of an uplink subframe carrying an ACK/NACK signal to which the present invention is applied.

FIG. 6 is a view illustrating an example of a structure of an uplink subframe carrying an ACK/NACK signal to which the present invention is applied.

Referring to FIG. 6, an uplink subframe may be divided into a control region to which a physical uplink control channel (PUCCH) that carries uplink control information is allocated; the control information includes an ACK/NACK response of downlink transmission. A data region to which physical uplink shared channel (PUSCH) that carries user data is allocated in the frequency domain.

To maintain a single-carrier property, one UE may not simultaneously transmit the PUCCH and the PUSCH. However, if a UE is capable of simultaneous PUCCH/PUSCH transmissions, it is also feasible for one UE to transmit PUCCH and PUSCH at the same subframe. In the subframe, pair of RBs is allocated to the PUCCH with respect to one UE, and the allocated resource block (RB) pair is resource blocks corresponding to different subcarriers in each of two slots. This is called that the RB pair allocated to the PUCCH are frequency-hopped at a slot boundary.

The PUCCH may support multiple formats. Namely, it can transmit uplink control information having different number of bits per subframe according to a modulation scheme. PUCCH format 1 is used to transmit a scheduling request (SR), and PUCCH formats 1a and 1b are used to transmit an HARQ ACK/NACK signal. PUCCH format 2 is used to transmit a CQI, and PUCCH formats 2a and 2b are used to transmit a CQI and a HARQ ACK/NACK. When an HARQ ACK/NACK is transmitted alone, PUCCH formats 1a and 1b are used, and when an SR is transmitted alone, PUCCH format 1 is used. And PUCCH format 3 may be used for the TDD system, and also the FDD system. Meanwhile, as the increased demands for the high data rate transmission, the mobile communication system composed of aggregated multiple CCs (component carriers) is being researched.

The ePDCCH can be one of solutions of limitation for a PDCCH transmission or new control information transmission of near future commination system including a new type of carrier as shown in FIG. 7. The ePDCCH which can be multiplexed with the PDSCH can support multiple Scells of the CA.

Referring to FIG. 7, the ePDCCH can be placed in data region which conveys control information. So, the UE can monitor a plurality of PDCCH/ePDCCHs within the control region and/or data region. As the PDCCH is transmitted on CCE, ePDCCH can be transmitted on eCCE (enhanced CCE) as an aggregation of some contiguous CCEs, the eCCE corresponds to a plurality of REGs. If ePDCCH is more efficient than PDCCH, it is worthwhile to have subframes where only ePDCCHs are used without PDCCHs. The PDCCHs and new ePDCCH only subframes, or have only ePDCCH only subframes can be in a new type of carrier as NC which has both legacy LTE subframes. It is still assumed that MBSFN subframes exist in a new carrier NC. Whether to use PDCCH in MBSFN subframes in NC and how many ODFM symbols will be allocated if used can be configured via RRC signaling. Further TM10 and new TM mode of UE can be considered for new carrier type as well. Hereafter, new carrier type refers to a carrier where all or part of legacy signals can be omitted or transmitted in different manners. For example, a new carrier may refer a carrier where CRS may be omitted in some subframes or PBCH may not be transmitted. A new carrier may not mean that Rel-11 and below UEs may not be able to access the carrier. However, it is expected that Rel-11 and below UEs may not achieve the same performance compared to legacy carrier due to a certain features lacking such as continuous CRS transmission.

As described, in the new carrier, a special subframe may not have legacy PDCCH and starts PDSCH at first OFDM symbol, the number of OFDM symbols used in PDSCH in special subframe is increased to 8-11 from 7-10 in normal CP. When the number of OFDM symbols is equal to or greater than 11 which is the basis of TBS calculation in normal subframe in normal carrier, the scaling factor may be increased to 1. Furthermore, this invention proposes to use OFDM symbol 0, 1 for CSI-RS REs. The CSI-RS can be used for Radio Resource Management (RRM), fine time/frequency tracking and/or interference measurement. In small cell environments where small cells are densely deployed, the CSI-RS in current specification may not be sufficient to perform those functions as there are a large number of neighbor small cells which like to use orthogonal resources.

For this next LTE system or enhanced communication system, this invention provides that the new carrier cell may be introduced in which all or some of the proposed backward compatible legacy signals and/or channels are not transmitted for reasons of the improvement of an interference problem between a plurality of cells, the enhancement of carrier extensibility, and an increase in the degree of freedom in providing advanced features. Even though the proposed invention is mainly described for the new carrier cell as an example, it does not limit to the new carrier cell only. It can be applied to legacy carriers without the loss of generality as well. More details, this invention considers cases where cell-specific RS used for tracking and the RRM measurement would not be transmitted at all or transmitted only a subset of subframes different from legacy carrier. For a convenience, this invention shows an example where CRS or tracking RS is transmitted every 5 msec e.g., subframe #0 and #5 in each radio frame. More particularly, a new carrier may refer a carrier which performs cell on/off where eNB turns off transmissions upon no active UE attached or based on a pattern. If this is assumed, this invention shows an example where PSS/SSS/CRS or a discovery signal based on CSI-RS is transmitted every T msec with a predetermined value e.g., T=200, or more than 200.

This invention which supports the next LTE system or enhanced communication system provides solutions to support efficient transmission within small cells. More specifically, this invention provides small cell environments, to reduce UE power consumption due to synchronization to cell search and to perform time/frequency tracking more finely, etc. Herein, the discovery signal may be transmitted with or without existing synchronization channel and may be transmitted in both active and inactive state or only in inactive state. Especially, for detecting synchronization and decoding data in small cells are needs to be defined more concretely. So this invention provides that a solution a synchronization relation and QCL (Quasi-Collocated) relationship can be applied differently based on UE mobility in small cell environment.

Here, a QCL (Quasi-Collocated) relationship between two antenna ports or two signals can be defined that if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, and average delay. Thus, physically antenna ports are placed in different places, from a UE perspective, the received channel quality from two antenna ports or signals are assumed to be similar. This would be useful particularly for cases where reduced signals are transmitted for time/frequency tracking or synchronization where coarse time/frequency tracking can be inferred from other signals transmitted in different antenna port or from different transmission points. One example of QCL relationship is that between two transmission points performing transmission coordination for a UE, CSI-RS and DM-RS from a TP can be assumed to be QCL relationship or CRS from a serving TP and CSI-RS from another TP can be assumed to be QCL relationship (not necessarily for all the large-scale properties). More generally, to perform time/frequency tracking of signals transmitted from a TP can be assisted by signals transmitted by another TP. In that case, those two signals can have QCL relationship, at least for some large-scale properties such as received timing.

Figure 8:
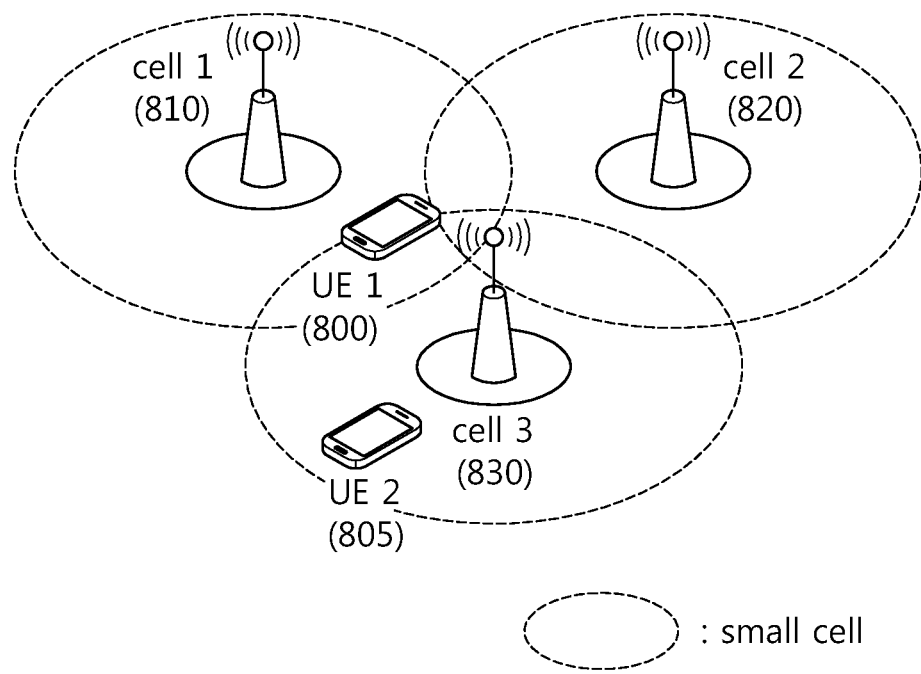
FIG. 8 shows a wireless communication system within small cells as exemplary embodiment of the present invention.

FIG. 8 shows a wireless communication system within small cells as exemplary embodiment of the present invention.

Referring to FIG. 8, when a small coverage of a small cell e.g., 50 m-100 m is considered, it is highly likely that small cells may not discover each other directly and thus may not identify interfering neighbor cells directly. Moreover, small cells each would be not controlled by the network, and thus UE involvement in terms of interference handling and synchronization handling would be necessary.

Meanwhile, a UE with low mobility such as a user inside the building moving within a same floor is considered, it is likely that one small cell may not cover the UE entirely. But a few small cells formed a cluster which may cover the UE. For example, the UE moves around within Cell 1 ↔ Cell 3 ↔ Cell 2 as shown in FIG. 8, it would be desirable not to incur any hand-over among cells particularly when the UE moves around those cells frequently such as UE moves around the same floor continuously. Techniques such as forming the cluster, tight coordination among small cells, smooth/soft hand-over would be useful in this scenario.

This proposed invention particularly focuses on CoMP technique where cells within a cluster collaborate with each other to seamlessly support the UE. Different from existing CoMP assumptions, cells within a small cell cluster would turn on or off its power, or transmission to save energy and mitigate inter-cell interference. Moreover, from a UE perspective, it is not assumed that all cells within a cluster are reachable all the time. It is highly likely that only a subset of cells is accessible from the UE perspective at any given time. Based on CoMP technique where each TP (transmission point) is differentiated based on non-zero-power CSI-RS resource, this invention further relaxes the assumptions of CoMP set and discusses necessary extensions.

Furthermore, for an efficient operation for a dense hot spot in the small cell deployment, it can be further considered turning on/off cells rather dynamically or semi-statically. And it is needed to seem to an identical reference signals transmitted from a same small cell having a best signaling strength rather than some of difference reference signals transmitted from different small cells for the UE. Proposal of this invention can be applicable to the case where cell on/off is performed and then discovery signals are transmitted. It can be assumed that invention applied to TRS/CRS can be applied to discovery signals without loss of generality. TRS (tracking RS) refers reference signals used for time/frequency. It can be assumed that discovery signals which may have different periodicity and/or resource from the currently existing PSS/SSS/CRS or CSI-RS can be transmitted which will be used for cell identification, synchronization, and/or measurement.

First of all, small cells within a cluster may have different system bandwidth, duplex mode (FDD or TDD), frequency, uplink resource (e.g., PUCCH offset), etc. So a configuration including RS configuration and Quasi-collocation (QCL) relationship between and macro cell and small cells, or between small cells for a better small cell deployment in thin invention may be supported. This invention supports that a UE is configured in transmission mode 10 for a given serving cell can be configured with up to 4 parameter sets by higher layer signaling to decode PDSCH according to a detected PDCCH/EPDCCH with DCI format 2D intended for the UE and the given serving cell. The UE shall use the parameter set indicated in the detected PDCCH/EPDCCH with DCI format 2D for determining the PDSCH RE mapping and PDSCH antenna port quasi co-location. The following parameters for determining PDSCH RE mapping and PDSCH antenna port quasi co-location are configured via higher layer signaling.

Each parameter set includes a number of CRS antenna ports for PDSCH RE mapping, CRS frequency shift for PDSCH RE mapping, MBSFN subframe configuration for PDSCH RE mapping, Zero-power CSI-RS resource configuration(s) for PDSCH RE mapping, PDSCH starting position for PDSCH RE mapping, CSI-RS resource configuration identity for PDSCH RE mapping. Or, when a UE configured in transmission mode 10 for a given serving cell can be configured with a parameter 'zero-power CSI-RS resource configuration(s) for PDSCH RE mapping' by higher layer signaling for determining the PDSCH RE mapping to decode PDSCH according to a detected PDCCH/EPDCCH with DCI format 1A intended for the UE and the given serving cell. The UE shall use the zero-power CSI-RS resource configuration(s) for PDSCH RE mapping, if configured, for decoding the PDSCH corresponding to detected PDCCH/EPDCCH with DCI format 1A.

Herein, the present inventions show that antenna ports quasi co-location for PDSCH. When a UE is configured in transmission mode 1-10 may assume the antenna ports 0-3 of a serving cell are quasi co-located with respect to delay spread, Doppler spread, Doppler shift, average gain, and average delay. A UE configured in transmission mode 8-10 may assume the antenna ports 7-14 of a serving cell are quasi co-located for a given subframe with respect to delay spread, Doppler spread, Doppler shift, average gain, and average delay. A UE configured in transmission mode 1-9 may assume the antenna ports 0-3, 5, 7-22 of a serving cell are quasi co-located with respect to Doppler shift, Doppler spread, average delay, and delay spread. A UE configured in transmission mode 10, and on detecting a PDCCH/EPDCCH with DCI format 2D intended for the UE in a given subframe, may assume the antenna ports 15-22 corresponding to the CSI-RS resource configuration identified by 'CSI-RS resource configuration identity for PDSCH RE mapping's in Table 4 and the antenna ports 7-14 are quasi co-located for the given subframe with respect to Doppler shift, Doppler spread, average delay, and delay spread.

TABLE 4

| Value of 'PDSCH RE Mapping and Quasi-Co-Location Indicator' field | Description |
| --- | --- |
| '00' | Parameter set 1 configured by higher layers |
| '01' | Parameter set 2 configured by higher layers |
| '10' | Parameter set 3 configured by higher layers |
| '11' | Parameter set 4 configured by higher layers |

As described for time/frequency tracking, there are potentially multiple scenarios can be considered as follows. When a UE is configured with information to indicate reference signals, UE can select either the configured reference signals or reference signals it is aware of. In terms of signaling mechanisms to indicate the reference signals for time and/or frequency tracking such that a Cell ID where a UE can locate the cell specific RS can be used. Or, antenna port # (with or without using the Cell ID above) where a UE can read reference signals, or a QCL relationship which can be one type of signal is possible. Lastly, a resource configuration or multiple resource configurations where measurement or tracking signal(s) are transmitted can be used. One example of this resource configuration or multiple resource configurations is to have CSI-RS resource configuration where cell ID may be known to the UE or not.

More details, the following this invention shows that a UE is configured with a reference sync signals. When a UE knows that the reference signals are transmitted via the same transmission site, regardless of UE널 speed or mobility, it can assume the indicated reference signals can be used. When a UE cannot be assured that the reference signals are transmitted via the same transmission site, it cannot assume that the indicated reference signals can be used in at least high speed mobility. Alternatively, if a UE knows that reference signals are not transmitted from the same transmission site to the transmission site/point of data, the configured reference signals are used only if it does not have any other signals for time/frequency tracking. Or, reference signals are used only for frequency tracking if reference signals can be used for frequency tracking.

For example, a QCL relation can be configured only for time tracking purpose whereas frequency tracking is based on reference signals transmitted from the cell itself where data is transmitted.

The a QCL relation configuration includes a neighbor cell information including cell ID, which is for CRS related parameters, PQI (PDSCH Rate Matching Quasi-collocation Index) table including TP's CSI-RS resource, MBSFN subframe configuration, CRS related information, and QCL RS information, etc. If a TP is mapped to a non-zero-power CSI-RS resource, it is easily assumed that one of cell configuration each and one entry configurations form can be mapped to a TP. Extending the concept to apply some relaxation of CoMP set, following three approaches are feasible in this invention. The CoMP set can be defined a new set to include a set of parameters are not covered by neighbor cell list or PQI table. Also the CoMP set can be expanded the set of neighbor list to include CSI-RS resource and the necessary parameters or expanded PQI table to include the necessary parameters. To support flexible change of the serving cell, this invention proposes to configure an index by higher-layer, for example, an index to PQI table can be configured if the expanded PQI table to include the necessary parameters is used. Or an index to PQI/neighbor list can be configured if the new set to include a set of parameters are not covered by neighbor cell list or PQI table or the expanded set of neighbor list to include CSI-RS resource and the necessary parameters is used. Assuming the approach of the expanding PQI table is used, to change the set of activated TPs/Cells, eNB may reconfigure the subset of active PQI table entries. If PQI table is used for a set of small cells where each PQI entry is mapped to a small cell, PQI table entry may have to be redefined as below.

Specified fields for signal of change of the serving cell can be included as following. Cell information which the UE can assume Quasi-collocated with the CSI-RS defined in this entry including cell ID is to be included. CRS Port #, Vshift, MBSFN subframe configuration, ZP CSI-RS, PDSCH starting symbol, or NZP CSI-RS respectively, can be included in this invention. Further this invention proposes to add parameters newly by including System Bandwidth, Number of DM-RS ports (optional if different number of DM-RS ports are used within a cluster), CP Length (optional if different CP lengths are supported among cells within a cluster), SIB-linked uplink information (e.g., PUCCH information, etc), One or more associated ePDCCH sets optional if ePDCCH is used, A set of subframes where the UE may assume control channel and/or data channel comes from this TP (or small cell).

If ePDCCH is configured, the configured set of subframes for the TP may be assumed to be subframes which carry ePDCCH (i.e., ePDCCH monitoring subframes for this TP=the set of subframes configured for this TP). If multiple ePDCCH sets are configured, one set of subframes apply to all ePDCCH sets. Here, if the configured cell is TDD cell, this list may include the set of usable uplink subframes as well. If TDD is used, a separate parameter of TDD configuration for uplink and downlink respectively may be given. If FDD is used, the uplink timing is determined by downlink timing (i.e., by scheduling, uplink timing is determined). The one of new or legacy fields can be included in the signal of change of the serving cell.

If approach of expansion of CSI-RS resource is used, it is assumed that a UE is pre-configured with a set of CSI-RS resources where each CSI-RS is mapped to a TP (or a cell). It is noted that one or more CSI-RS resources can be mapped to a TP (or a cell) and indicates a subset of CSI-RS resources as active resources to a UE where only TPs (or cells) covered by the activated CSI-RS resources are considered as active cells. To change the set of activated TPs (or cells), eNB may reconfigure the subset of active CSI-RS resources. Regardless of which option used, it is assumed that each TP/cell have one or more different CSI-RS resource configured. Hereinafter, this invention provides a small cell cluster including serving cell change, an example is shown how CoMP technique is utilized for a small cell cluster based on approach of expansion of PQI table.

For this, eNB transmits a signaling to indicate whether the reference signals are transmitted from the co-site. Additional indication may be given to a UE via higher layer signaling when a reference signal is configured. For example, a list of cell IDs that UE can assume as co-site can be given or an indication in the reference configuration can be given such that if it is set to 1, so the UE can assume the reference signals are transmitted to the serving cell as co-site, otherwise, UE cannot assume the reference signals are transmitted from difference site.

If reference signals are not transmitted from co-site, only a rough time/frequency tracking based on the configured reference signal would be feasible. One example of this is to use macro-cell PSS/SSS/CRS for a rough time/frequency tracking to receive any measurement signals transmitted on small-cell where a fine time/frequency tracking may be performed by measurement signals transmitted from the small cell itself.

Once a UE is configured with a reference signal, it can assume that synchronization between data transmission point and the carrier where reference signal is transmitted is performed within a reasonable synchronization error such that a UE can detect and perform fine time/frequency tracking using measurement RS transmitted in data transmission point. When a UE is configured with a reference signal for a TP which has a different cell ID from the reference carrier, it may assume that reference signals are transmitted from different site and thus only coarse time/frequency tracking may be allowed.

Figure 9:
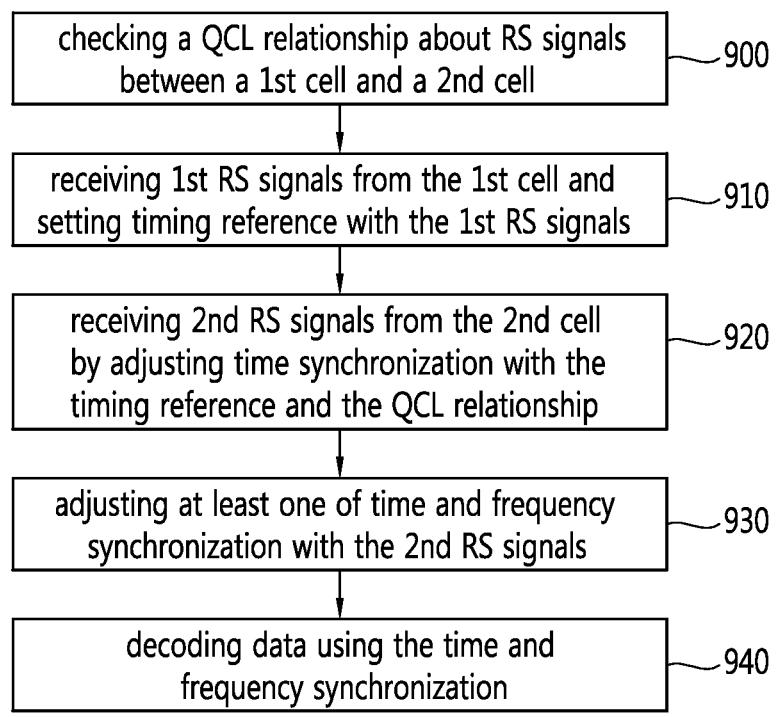
FIG. 9 shows an example of flowchart for applying reference signals of relationship adaptively which the present invention is applied.

FIG. 9 shows an example of flowchart for applying QCL relationship adaptively which the present invention is applied.

Referring to FIG. 9, a UE can checks a QCL relationship about RS signals between a $1^{st}$ cell and a $2^{nd}$ cell, herein the $1^{st}$ cell and a $2^{nd}$ cell can includes a macro cell and a small cell, or a serving cell and an extended cell for data offloading. The UE can receive or configure an indication to apply the QCL relationship about RS signals for the $1^{st}$ cell and the $2^{nd}$ cell by additional signaling (900). As example, the description of cells in the CoMP operation defined for a particular parameter set can be replaced. The specific set of parameters, or the area in which the actual data is transmitted RE (or, to be excluded from receiving data area or RE, and/or non-use of data (eg, CRS and/or CSI-RS as RS resource) is used as area or RE) RE corresponding data for mapping information, or it can be inferred information may include. In addition, the specific set of parameters of the signal (eg, RS)/channels (the transfer cells/point) between the geographical/physical location of the same/similarity (or, for example, the Doppler shift/spread (Doppler shift/spread) and/or the average delay/delay spread (average delay/delay spread) in terms of the terminal which signals/channels (the transfer cells/point) for the other semi-same-position (Quasi-Co-Location, QCL) assumed to be/should be considered), etc., including the corresponding information can be QCL.

And then the UE can receives RS signals from the $1^{st}$ cell, the RS signals from the $1^{st}$ cell can be called $1^{st}$ RS signals. The UE can set a timing reference to receive data transmitted from data transmission points using the $1^{st}$ RS signals (910). The timing reference can be temporary time synchronization since the data can be transmitted/received with delays and interferences when the data transmission points are co site more.

The UE can receive further RS signals from the $2^{nd}$ cell by adjusting time synchronization more finely when it is needed or configured by the network or a serving cell to control more accurate synchronization between data transmission point and the carrier as the data transmission points where reference signal is transmitted is performed. For this, the UE can adjust timing reference for RS signals of the $2^{nd}$ cell using the QCL relationship including a RS configuration between the $2^{nd}$ cell and reference cell as the serving cell, that is, the UE determines a reference time for the $2^{nd}$ RS signals and detects the RS $2^{nd}$ signals (920).

The UE can also adjust frequency synchronization by the $2^{nd}$ RS signals by applying the QCL relationship including a RS resource configuration between the $2^{nd}$ cell and reference cell as the serving cell or the UE can also adjust frequency synchronization by the $2^{nd}$ RS signals by detecting discovery signals including synchronization signal or measurement signals transmitted from small cells (930). So the UE can decode data with PDSCH at determined subframe and frequency bandwidth using time and frequency synchronization adjusted more finely by the $2^{nd}$ RS signals (940). Herein, the small cells as being possible to different data transmission points each can share an identical cell ID so that the UE understands (or knows) that reference signals are transmitted from the same transmission site to the transmission site/point of data.

More particularly, in terms of time tracking, regardless of co-site assumption, UE can still use the configured reference signals. The separation may be applicable only to frequency tracking. When a UE is configured with QCL relationship rather than reference to the reference signals for time/frequency tracking, it is assumed that a UE can perform a fine-tuned time/frequency tracking on the serving cell with coarse-grained tracking using the configured QCL-ed RS. Assuming a tightly synchronized small cell to a macro cell transmitting infrequent discovery/measurement signals, a UE can perform time tracking based on signals from the macro cell and use the information to read signals transmitted from the small cell when QCL relationship between the macro RS to the small cell RS regards to timing aspect such as delay spread, received timing is configured/given. When this is applied, regardless of propagation delay between the macro cell and the small cell, the reception timing at the UE should be aligned. Two cases can be considered.

Firstly, if a small cell synchronizes itself against a macro cell via network listening, a propagation delay should not be compensated assuming propagation delay from small cell to UE is negligible. In this way, it supports to allow simultaneous or aligned reception timing at the UE regardless of actual topology of the macro and small cells. Secondly, if a small cell synchronizes itself using GPS-like external timing devices, the small cell and the macro may need to align by applying timing advance in transmission from small cell so that reception timing at the UE can be aligned. One of good approaches for this is to propagate TA configured for a UE to a small cell which will be used for data transmission point for that specific UE. So the same TA can be applied to the transmission of the small cell. Alternative approach for this is to utilize network listening regardless of external synchronization devices for time synchronization such that reception timing at a UE can be aligned from both transmission points. It could be considered that a macro cell may indicate the necessity of 'relative-timing' synchronization to small cells which can be considered as 'dependent carrier' in a sense that discovery signals transmitted in small cells can be readable only if a UE is synchronized with macro cell and then timing alignment between macro and small cells are achieved.

Or, alternatively a UE may expect to receive discovery signals from small cells with timing difference which can be calculated from a configured timing advance value. It may attempt to read discovery signals from small cells with two timing values. One is to assume that discovery signal may be transmitted aligned with transmission from macro-layer. And the other is to assume that discovery signal may be transmitted TA/2 earlier than transmission from macro-layer. Or, when a UE is configured with QCL relationship between small cell and macro cell, it may assume that the transmission timing is already aligned. Thus, based on time tracking per macro cell, it may expect to receive discovery signals from small cell assuming time synchronization is achieved.

In this case, it is necessary to define a QCL relationship between CRS transmitted from a macro cell to discovery signal transmitted from a small cell and the QCL relationship should be known to UE. One approach is to give a QCL relationship per discovery signal resource configuration or CSI-RS configuration used for a discovery signal from a small cell or gives a list of small cells or discovery signal resource configurations used by small cells which has QCL relationship to a macro cell's CRS. For that, a QCL relationship with regard to doppler spread, received timing between CRS of macro cell (cell ID) and a CSI-RS or discovery signal resource configuration can be configured for the UE. Or a QCL relationship with regard to doppler spread, received timing between CRS of a macro cell (cell ID) to a list of CSI-RS/discovery signal resource configurations can be set. As described, this invention includes that QCL relationship can be all or partial of delay spread, Doppler spread, and received timing.

Further, for frequency tracking, a UE can be configured with a cell ID which can be used for frequency tracking for discovery signal transmissions from multiple small cells. For example, if there are 10 small cells where frequency synchronization among small cells are achieved against a cell with cell ID=1, a UE can be configured with QCL with regard to frequency shift and/or doppler spread such as QCL with regard to frequency shift and/or doppler spread between CSI-RS or discovery signal or CRS or any RS used for network synchronization of a small cell (cell ID) and a list of CSI-RS/discovery signal resource configurations, or per each CSI-RS/discovery signal resource configuration.

In summary, if discovery signals from multiple small cells are multiplexed in the same resource including PRB, subframe, with two set of information would be needed. If redundant, only one information may be used. The QCL RS where rough time synchronization can be achieved. For example, macro cell's CRS can be used as a timing reference for the discovery signals reception. A separate fine time tracking based on discovery signal may be needed. In this case, a reference cell ID or reference RS can be also signaled which a UE can use for fine time tracking purpose. Or, the QCL RS where a frequency tracking can be achieved. For example, a small cell's CRS or discovery signal can be used as a frequency tracking reference for the discovery signal reception.

Here, the discovery signal can include CSI-RS based measurement/discovery signals, or CRS based measurement/discovery signals or PRS based measurement/discovery signals. Further QCL relationship for time tracking can be given between macro and a small cell cluster head or a controlling eNB in the small cell layer which can be used as QCL relationship for frequency tracking among small cells.

Figure 10:
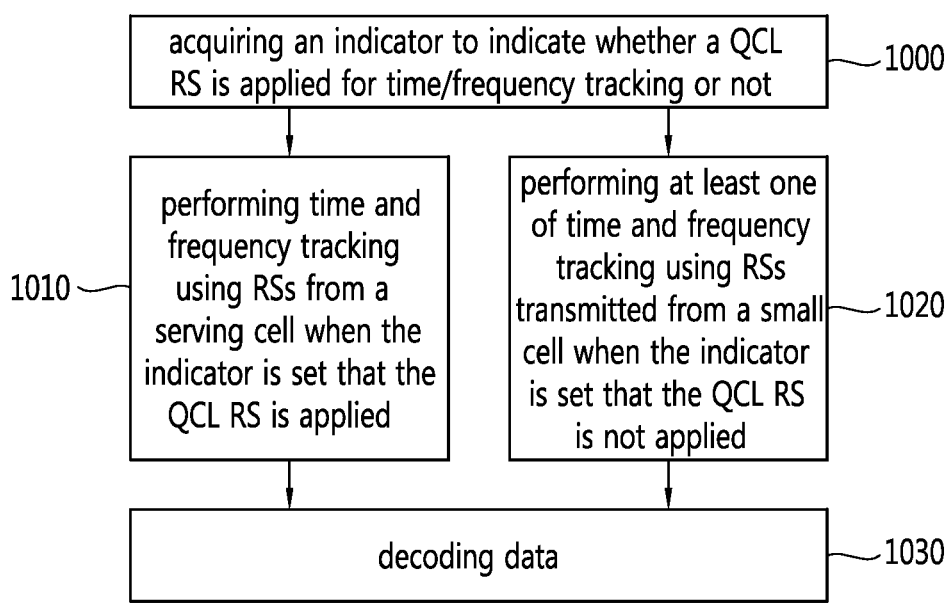
FIG. 10 shows another example of flowchart for applying reference signals of relationship adaptively which the present invention is applied.

FIG. 10 shows another example of flowchart for applying QCL relationship adaptively which the present invention is applied.

Referring to FIG. 10, a UE can acquire whether a QCL RS is applied for time/frequency tracking or not for detecting discovery signals from multiple small cells (1000). It can be acquired by receiving an indication indicating that the QCL RS is applied or not according to a small cell for time/frequency tracking. The indication can be signaled by the PDCCH (or ePDCCH) of L1 signal, an MAC signal such as Scell activation/deactivation including the indication defined newly of L2 signal, RRC signal including each Scell configuration and the indication corresponding to a Scell.

When the indicator is set that the QCL RS is applied for detecting discovery signals from multiple small cells each, the UE performs rough time/frequency tracking to receive any synchronization and measurement signals including PSS/SSS/CRS transmitted on macro cell as a serving cell, the UE performs a fine time/frequency tracking by discovery signals transmitted from the small cells each by using the QCL RS and measurement signals transmitted on the macro cell (1010).

On the other hand, when the indicator is set that the QCL RS is not applied for detecting discovery signals from multiple small cells each, the UE performs at least one of time and frequency tracking using discovery signals transmitted from small cells each (1020). Herein the UE may adjust time tracking with the macro cell and frequency tracking using discovery signals transmitted from small cells each, for this, the discovery signal can be transmitted TA/2 earlier (or a compensated value having a delay offset) than transmission comparing with the macro cell. Or, the transmission timing for the discovery signals is already aligned to the macro cell. That is, based on time tracking per macro cell, it may expect to receive discovery signals from small cells assuming time synchronization is achieved. So the UE adjust the frequency tracking using the discovery signals to detect data of the transmission points more accurately.

Thus, the UE can decode data with PDSCH at subframe and frequency bandwidth determined by the time and frequency synchronization (1030).

Another approach is that each small cell may propagate the information of clock source(s) which are used for time and/or frequency synchronization or which should be used for time and/or frequency tracking from a UE perspective to receive discovery signal and/or data reception.

Further, the macro cell may send the list of {<source cell for time sync, source cell for frequency sync>, small cell ID} for small cells which a UE will receive discovery signals such that a UE can receive discovery signals successfully.

This invention would be more useful when unlicensed band or secondary licensed band are configured as a TP or SCell for an UE. As scheduling may be performed by an anchor carrier which manages the unlicensed band or secondary licensed band, tight synchronization between anchor and dependent carrier would be desirable.

If QCL is used, it is not related to co-site anymore, it is more related to synchronization property. When a UE is configured with QCL, it is critical to determine for a UE whether QCL RS signals are good for time/frequency tracking or not. Multiple approaches would be feasible to help this situation. One approach is that the transmission point transmitting QCL RS for a UE may monitor the UE mobility and if the quality of QCL RS becomes poor due to UE mobility, it may send higher layer signaling to the UE to indicate that or the transmission point may transmit RACH-like (or PSS/SSS) tracking signaling so that UE can rely on different RS/channels for time/frequency tracking. When a UE is indicated with low quality of QCL RS, the UE may perform tracking for frequency using the signals from the serving cell.

Alternatively, for QCL relationship, the same approaches mentioned for time/frequency tracking reference signals can be applied. In other words, UE may determine to use which signals for frequency tracking based on its mobility and the relationship between QCL RS transmission points and serving cell. More specifically, higher layer configuration is feasible to indicate the list of transmission points that UE can assume as 'co-site' with serving cell for both cases. The possible signaling mechanisms would be to transmit either a set of cell IDs for the co-site TPs, a set of antenna ports for co-site TPs, a set of CSI-RS resources/indexed for co-site TPs, a cluster ID, etc.

Figure 11:
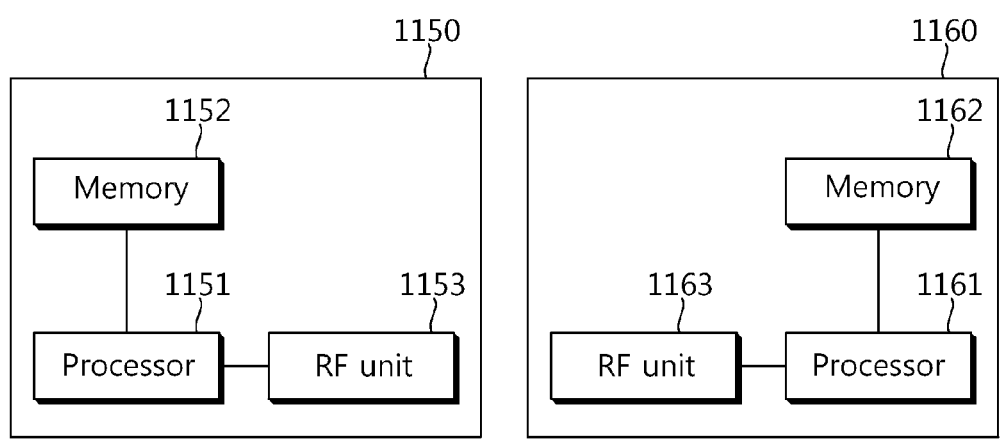
FIG. 11 shows a block diagram showing a wireless communication system according to an exemplary embodiment of the present invention.

FIG. 11 is a block diagram showing a wireless communication system according to an embodiment of the present invention.

A BS 1150 includes a processor 1151, a memory 1152, and a radio frequency (RF) unit 1153. The memory 1152 is coupled to the processor 1151, and stores a variety of information for driving the processor 1151. The RF unit 1153 is coupled to the processor 1151, and transmits and/or receives a radio signal. The processor 1151 implements the proposed functions, procedures, and/or methods. In the embodiments of FIG. 2 to FIG. 10, the operation of the BS can be implemented by the processor 1151.

Especially, the processor 1151 may configure one or more cells with different frequencies, for this invention the processor 1151 configures the cells to support Semi-Persistent Scheduling, TTI-bundling, HARQ-ACK procedures. The processor 1151 may configure configurations for RS signals on a $1^{st}$ cell and a $2^{nd}$ cell, in addition to, an advanced type of configurations or a set of for RS configurations of RS signals between the $1^{st}$ cell and the $2^{nd}$ cell to support more fine a time and a frequency tracking by the UE. Here, the configuration includes a $1^{st}$ RS configuration for the $1^{st}$ cell of a macro cell or a serving cell and a $2^{nd}$ RS configuration for the $2^{nd}$ cell of at least one small cell in a small cell cluster including a pico cell, a pemto cell, and a Quasi-collocation (QCL) configuration between the $1^{st}$ RS signals and the $2^{nd}$ RS signals to be transmitted on $1^{st}$ cell including a macro cell and the $2^{nd}$ cell including a small cell. Here, the $1^{st}$ RS configuration includes at least one of configuration for a primary synchronization signal (PSS) and a secondary synchronization signal (SSS), a cell-common reference signal (CRS), or channel information reference signal (CSI-RS) to be transmitted on the $1^{st}$ cell, and the $2^{nd}$ RS configuration includes a configuration for discovery signals to be transmitted on the $2^{nd}$ cell.

The processor 1151 may set and provide the QCL relationship for time tracking can be given between the macro and a small cell cluster head or a controlling eNB in the small cell such as the QCL relationship between CRS transmitted from a macro cell to discovery signal transmitted from a small cell, and QCL relationship for frequency tracking among small cells. Also the processor 1151 may set a list of {<source cell for time sync, source cell for frequency sync>, small cell ID} for UE to receive discovery signals on the small cells. Further, the processor 1151 may set an indicator indicating that the QCL RS is applied for detecting discovery signals from multiple small cells each.

The processor 1151 may set to apply a TA value of the macro cell and a predetermined offset according to the small cell for a corresponding a small cell. So the small cell can transmit the discovery signals to UE at subframe by adjusted a timing synchronization in order to perform only a frequency tracking using the discovery signals by the UE. Herein, the TA value includes a predetermined value for a small cell.

Furthermore, the processor 1151 may set an indication whether a QCL relationship is applied for RS signals transmitted between one cell and anther cell in consideration to UE's mobility. That is, the processor 1151 may configure the RS configuration and QCL configuration to perform synchronization and measurement between anchor reference signals and dependent reference signals using discovery signals, thus to support more efficient and rapid synchronization and measurement for decoding data by the UE.

The wireless device 1160 includes a processor 1161, a memory 1162, and an RF unit 1163. The memory 1162 is coupled to the processor 1161, and stores a variety of information for driving the processor 1161. The RF unit 1163 is coupled to the processor 1161, and transmits and/or receives a radio signal. The processor 1161 implements the proposed functions, procedures, and/or methods. In the embodiments of the FIG. 2 to FIG. 10, the operation of the UE can be implemented by the processor 1161.

Especially, the processor 1161 may configure one or more cells with different frequencies, for this invention the processor 1161 configures the cells to support Semi-Persistent Scheduling, TTI-bundling, HARQ-ACK procedures. The processor 1151 may receive, check and configure configurations for RS signals on a $1^{st}$ cell and a $2^{nd}$ cell, in addition to, an advanced type of configurations or a set of for RS configurations of RS signals between the $1^{st}$ cell and the $2^{nd}$ cell to support more fine a time and a frequency tracking by the UE.

Here, the configuration includes a $1^{st}$ RS configuration for the $1^{st}$ cell of a macro cell or a serving cell and a $2^{nd}$ RS configuration for the $2^{nd}$ cell of at least one small cell in a small cell cluster including a pico cell, a pemto cell, and a Quasi-collocation (QCL) configuration between the $1^{st}$ RS signals and the $2^{nd}$ RS signals to be transmitted on 1st cell including a macro cell and the $2^{nd}$ cell including a small cell. Here, the $1^{st}$ RS configuration includes at least one of configuration for a primary synchronization signal (PSS) and a secondary synchronization signal (SSS), a cell-common reference signal (CRS), or channel information reference signal (CSI-RS) to be transmitted on the $1^{st}$ cell, and the $2^{nd}$ RS configuration includes a configuration for discovery signals to be transmitted on the $2^{nd}$ cell.

The processor 1161 may set and provide the QCL relationship for time tracking can be given between the macro and a small cell cluster head or a controlling eNB in the small cell such as the QCL relationship between CRS transmitted from a macro cell to discovery signal transmitted from a small cell, and QCL relationship for frequency tracking among small cells by receiving the RS configurations.

Also the processor 1161 may receive and set a list of {<source cell for time sync, source cell for frequency sync>, small cell ID} to detect discovery signals on the small cells. Further, the processor 1161 may receive and determine an indicator indicating that the QCL RS is applied for detecting discovery signals from multiple small cells each.

The processor 1161 may set to apply a TA value of the macro cell and a predetermined offset according to the small cell for a corresponding a small cell. So the small cell can transmit the discovery signals to UE at subframe by adjusted a timing synchronization in order to perform only a frequency tracking using the discovery signals by the UE. Herein, the TA value includes a predetermined value for a small cell.

Furthermore, the processor 1161 may set an indication whether a QCL relationship is applied for RS signals transmitted between one cell and anther cell in consideration to UE's mobility. That is, the processor 1061 may configure the RS configuration and QCL configuration to perform synchronization and measurement between anchor reference signals and dependent reference signals using discovery signals, thus to support more efficient and rapid synchronization and measurement for decoding data by the UE.

And, the processor 1161 may determine to be used different cell ID, different transmitting points having an identical cell ID for the $2^{nd}$ cell, or virtual cell ID at scrambling so that a UE knows whether the small cells are in co site or a small cell each is different site, or the macro cell and small cell are in co site or different site, and further active state or inactive state of each cell.

The processor 1161 may receive and check a RS including CRS/TRS (or CSI-RS) as $1^{st}$ RS signals and discovery signals as $2^{nd}$ RS signals at a predetermined or calculated PRB or time resources by checking the RS configuration including QCL relationship between the RS signals. The QCL configuration also includes a $1^{st}$ QCL relationship for a time tracking between the $1^{st}$ RS signals and the $2^{nd}$ RS signals, and $2^{nd}$ QCL relationship for a frequency tracking among the $2^{nd}$ RS signals. Also the processor 1161 may receive RS signals at subframes and a bandwidth predetermined according to the configuration and indication for a time and a frequency tracking and performs the time and frequency tracking more finely and adaptively according to data transmission points.

The processor may include application-specific integrated circuit (ASIC), other chipset, logic circuit and/or data processing device. The memory may include read-only memory (ROM), random access memory (RAM), flash memory, memory card, storage medium and/or other storage device. The RF unit may include baseband circuitry to process radio frequency signals. When the embodiments are implemented in software, the techniques described herein can be implemented with modules (e.g., procedures, functions, and so on) that perform the functions described herein. The modules can be stored in memory and executed by processor. The memory can be implemented within the processor or external to the processor in which case those can be communicatively coupled to the processor via various means as is known in the art.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

The invention claimed is:

1. A method for performing a synchronization in a wireless communication system, performed by a wireless device, the method comprising:
   receiving a configuration including a resource relationship about reference signals (RSs) between a first cell and a second cell;
   receiving a first reference signal (RS) from the first cell;
   determining a timing reference to receive a second RS based on the resource relationship;
   receiving the second RS from the second cell based on the determined timing reference;
   receiving an indicator to indicate whether or not the second RS is applied for frequency tracking of data signals;
   if the indicator indicates that the second RS is applied for the frequency tracking of data signals, performing the frequency tracking by using the second RS received from the second cell, and decoding data signals from the second cell; and
   if the indicator indicates that the second RS is not applied for the frequency tracking of data signals, performing the frequency tracking by using the first RS received from the first cell, and decoding data signals from the first cell.

2. The method of claim 1, wherein the resource relationship includes a first RS configuration and a second RS configuration for resource mapping,
   the first RS includes at least one of a primary synchronization signal (PSS) and a secondary synchronization signal (SSS), a cell-common reference signal (CRS), or a channel information reference signal (CSI-RS) to be transmitted on the first cell,
   the second RS signal includes a discovery signal to be transmitted on the second cell.

3. The method of claim 2, wherein the resource relationship includes:
   subframe information indicating a subframe gap between a subframe at which the first RS is received and a subframe at which the second RS is received, and
   resource information indicating offset between resource blocks at which the first RS is received and resource blocks at which the second RS is received.

4. The method of claim 1, wherein receiving the second RS from the second cell including:
   receiving a second configuration including a resource relationship about RSs between second cells; and
   receiving a plurality of second RSs from a plurality of second cells based on the resource relationship.

5. The method of claim 4, wherein the resource relationship includes:
   a first resource relationship including subframe information indicating a subframe gap between a subframe at which the first RS is received and subframes each at which the second RSs each is received, a second resource relationship including resource information indicating offset between resource blocks each at which the second RSs each is received,
   wherein the second RS signals are transmitted from different transmitting points.

6. The method of claim 1, wherein the indicator is determined by a mobility of the wireless device.

7. The method of claim 1, wherein receiving the second RS from the second cell including:
determining a value of timing advance (TA) of the first cell and a predetermined offset of the second cell; and
receiving the second RS at subframes determined by the value of TA and the offset.

8. A wireless device for performing an initial access procedure in a wireless communication system, the wireless device comprises:
a radio frequency (RF) unit for transmitting and receiving a radio signal; and
a processor, operatively coupled to the RF unit, that:
controls the RF unit to receive a configuration including a resource relationship about reference signals (RSs) between a first cell and a second cell;
controls the RF unit to receive a first reference signal (RS) from the first cell;
determines a timing reference to receive a second RS based on the resource relationship;
controls the RF unit to receive the second RS from the second cell based on the determined timing reference;
controls the RF unit to receive an indicator to indicate whether or not the second RS is applied for frequency tracking of data signals;
if the indicator indicates that the second RS is applied for the frequency tracking of data signals, performs the frequency tracking by using the second RS received from the second cell, and decodes data signals from the second cell; and
if the indicator indicates that the second RS is not applied for the frequency tracking of data signals, performs the frequency tracking by using the first RS received from the first cell, and decodes data signals from the first cell.

9. The wireless device of claim 8, wherein the resource relationship includes subframe information indicating a subframe gap between a subframe at which the first RS is received and a subframe at which the second RS is received, and
resource information indicating offset between resource blocks at which the first RS is received and resource blocks at which the second RS is received.

10. The wireless device of claim 8, wherein the processor:
controls the RF unit to receive a second configuration including a resource relationship about RSs between second cells; and
controls the RF unit to receive a plurality of second RSs from a plurality of second cells.

11. The wireless device of claim 9, wherein the resource relationship includes:
a first resource relationship including subframe information indicating a subframe gap between a subframe at which the first RS is received and subframes each at which the second RSs each is received, a second resource relationship including resource information indicating offset between resource blocks each at which the second RSs each is received,
wherein the second RS signals are transmitted from different transmitting points.

12. The wireless device of claim 8, wherein the processor:
determines a value of timing advance (TA) of the first cell and a predetermined offset of the second cell; and
controls the RF unit to receive the second RS at subframes determined by the value of TA and the offset.

* * * * *